United States Patent
Lee

[11] 3,980,262
[45] Sept. 14, 1976

[54] PIPE INSULATION LOAD BEARING SUPPORT

[75] Inventor: Harvey H. Lee, Pasadena, Tex.

[73] Assignee: Rilco, Division Sadler Industrial Services, Inc., Clute, Tex.

[22] Filed: Mar. 9, 1972

[21] Appl. No.: 233,042

[52] U.S. Cl. ............................ 248/65; 248/49; 248/55
[51] Int. Cl.² ............................ F16L 3/18
[58] Field of Search ............... 248/65, 49, 74 B, 62, 248/55, 54 R; 138/106, 137, 139, 140, 149

[56] References Cited
UNITED STATES PATENTS

| | | | |
|---|---|---|---|
| 1,079,758 | 11/1913 | Gray | 248/55 |
| 2,288,158 | 6/1942 | Ellinwood | 248/54 R X |
| 2,382,945 | 8/1945 | Trafton | 248/74 B X |
| 2,532,587 | 12/1950 | Williamson | 138/149 |
| 2,849,027 | 8/1958 | Tetyak | 248/49 X |
| 2,891,749 | 6/1959 | Heverly | 248/49 |
| 3,026,076 | 3/1962 | Bender | 248/49 |
| 3,315,927 | 4/1967 | Malloy et al. | 248/55 |
| 3,390,854 | 7/1968 | Sherburne | 248/55 |
| 3,472,474 | 10/1969 | Fountain et al. | 248/65 X |
| 3,530,899 | 9/1970 | Breeding | 248/62 X |
| 3,563,503 | 2/1971 | Lancaster | 248/49 |

FOREIGN PATENTS OR APPLICATIONS

| | | | |
|---|---|---|---|
| 672,530 | 10/1963 | Canada | 248/55 |

Primary Examiner—Roy D. Frazier
Assistant Examiner—Rodney H. Bonck
Attorney, Agent, or Firm—Jack W. Hayden

[57] ABSTRACT

An insulating and load bearing support for a tubular member such as a pipe includes a load bearing metal member with substantially a flat bottom and sides extending substantially the length of the bottom and perpendicular to the flat bottom for resting on a support member and bonded thereto throughout the contacting surfaces is a foamed plastic rigid load bearing substance such as high density polyurethane that is provided with an arcuate upper surface for conforming with the tubular member. The foamed plastic rigid load bearing member includes arcuate segments projecting beyond the ends of the flat bottom load bearing metal member whereby strap means may be engaged therewith for positioning the insulating and load bearing support adjacent the tubular member.

1 Claim, 4 Drawing Figures

PIPE INSULATION LOAD BEARING SUPPORT

The prior art with which applicant is familiar includes the following patents: United States Letters Patents to Lawton, U.S. Pat. No. 2,857,931; Heverly, U.S. Pat. No. 2,891,749; Kemper, U.S. Pat. No. 3,000,433; Seiler, U.S. Pat. No. 3,122,346; Litz, U.S. Pat. No. 3,185,758; Coffman, U.S. Pat. No. 3,244,388; Huelster, U.S. Pat. No. 3,336,951; and Lancaster, U.S. Pat. No. 3,563,503.

U.S. Pat. No. 3,563,503 and the other art discloses various forms of insulated pipe supports wherein the contact surface between the support and the insulation is relatively small, thus concentrating the load of the tubular member on the insulation over a relatively small area and increasing the total loading per unit area of the insulation.

Such arrangement is disadvantageous in that the high loading per unit area of the insulation may deform it or compress it or otherwise damage it so as to reduce its effectiveness.

SUMMARY OF THE INVENTION

The present invention relates to an insulation and load bearing support for a tubular member wherein a load bearing metal member is provided of unique configuration including a bottom which is substantially flat for engaging with a support throughout the width of the support and sides extending substantially throughout the length thereof and vertically relative to such flat bottom. A foamed plastic rigid load bearing material such as polyurethane is bonded to the sides and flat bottom of the load bearing metal member throughout their contacting surfaces and is provided with an arcuate surface for engaging against a tubular member. The arrangement of the flat bottom on the load bearing metal member enables a maximum amount of contact between a support and such load bearing metal member to thereby distribute the weight of the tubular member resting on the foamed plastic insulation over a maximum amount of area, thus decreasing the loading on the foamed plastic per unit area.

The present invention relates to an insulation and load bearing support for a tubular member wherein a load bearing metal member is provided of unique configuration including a bottom which is substantially flat for engaging with a support throughout the width of the support and sides extending substantially throughout the length thereof and vertically relative to such flat bottom. A foamed plastic rigid load bearing material such as polyurethane is bonded to the sides and flat bottom of the load bearing metal member throughout their contacting surfaces and is provided with an arcuate surface for engaging against a tubular member. The arrangement of the flat bottom on the load bearing metal member enables a maximum amount of contact between a support and such load bearing metal member to thereby distribute the weight over a maximum amount of area, thus decreasing the loading on the foamed plastic per unit area, and wherein the foamed plastic rigid material includes arcuate segments projecting beyond the ends of the flat bottom load bearing metal member whereby straps may be engaged therewith for positioning the load bearing metal member and foamed plastic rigid member bonded therewith relative to a tubular member.

Still another object of the present invention is to provide an arrangement for bonding an insulation such as foamed polyurethane to a load bearing metal support member having a substantially flat base for providing a maximum amount of contact surface with a support to thereby distribute the load carried by such arrangement over a maximum amount of area.

Other objects and advantages of the present invention will become apparent from a consideration of the following description and drawings.

DESCRIPTION OF THE PREFERRED EMBODIMENT

Figures 1, 4:
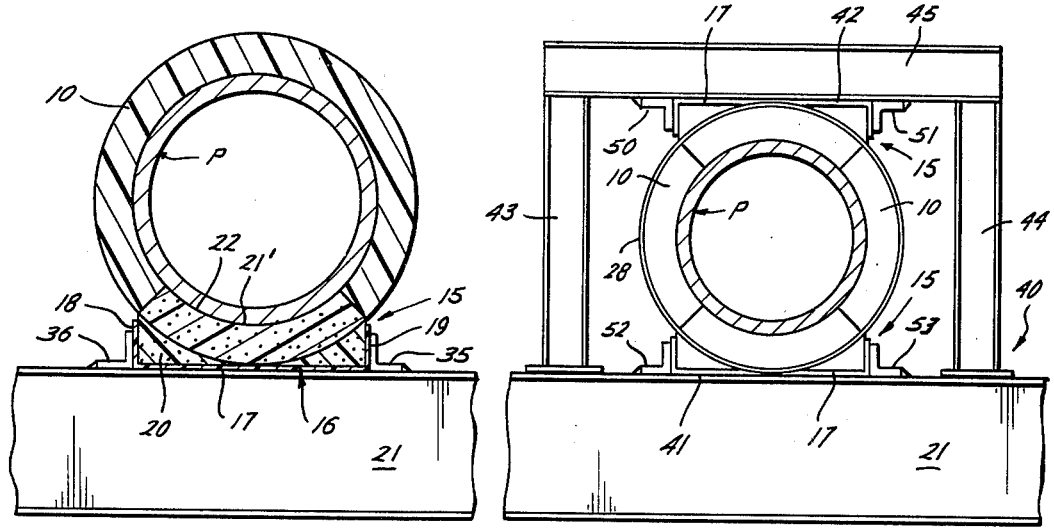
FIG. 1 is a sectional view illustrating the preferred embodiment of the present invention positioned on a tubular member.
FIG. 4 illustrates the invention employed as a guide and support to inhibit up and down movement as well as lateral movement of a tubular member.

Attention is first directed to FIG. 1 of the drawings wherein a tubular member is referred to generally by the letter P. The tubular member is illustrated as being provided with any form of suitable insulation represented at 10 and may be applied in any suitable arrangement such as in segments and then glued together, or in any other manner well known to those skilled in the art.

The present invention is referred to generally by the numeral 15 and is shown as including a load bearing metal member illustrated generally at 16 and shown as including a substantially flat bottom or base 17 with sides 18 and 19 extending substantially perpendicular thereto. Bonded to the flat bottom 17 and sides 18 and 19 throughout their contacting surfaces is a foamed plastic material 20, preferably polyurethane having a density in the range of 7 to 10 pounds per cubic foot, although polyurethane having greater density may be employed if desired. In addition to providing a load bearing plastic, the polyurethane provides good insulation and has a relatively low thermal conducting factor within the ranges of the densities employed.

In devices of the prior art, supports are provided with foamed polyurethane, but such supports provide a minimum of surface contact with a support member such as the I beam 21, or angle iron upon which the load bearing metal member 16 is adapted to be engaged. Such prior art arrangements thus concentrate the weight of the tubular member P so that the loading per unit area may become excessive and have deleterious effects upon the foamed plastic insulation.

The present invention, by employing a flat base or bottom 17 of substantial extent, enables the loading of the tubular member P to be distributed over a greater area, thus decreasing the loading per unit area and thus enabling polyurethane of lower density than otherwise would be possible to be emloyed.

It will be noted that the polyurethane is bonded to the bottoms and sides as previously mentioned and is provided with an upper arcuate surface 21' for conforming with the arcuate surface 22 on the tubular member P.

Figure 2:
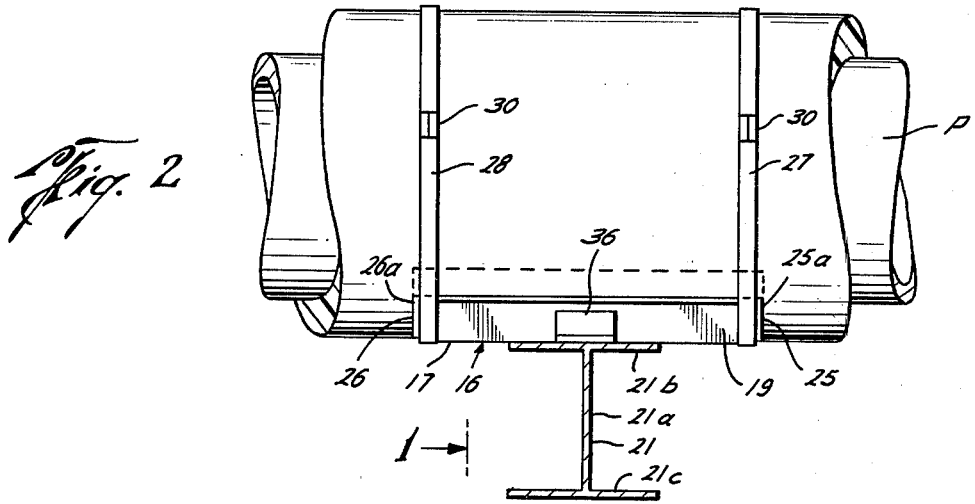
FIG. 2 is a side view of the invention shown in FIG. 1 illustrating suitable means for retaining the present invention adjacent a tubular member.
Figure 3:
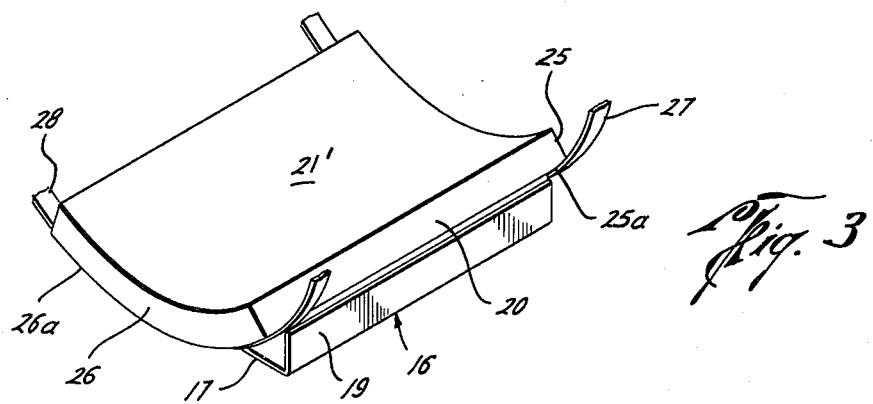
FIG. 3 is a perspective view illustrating the projecting arcuate segments at each end of the load bearing member to provide an arrangement for engaging and supporting the present invention adjacent the tubular member by strap means.

In addition, the foamed plastic member 20 extends beyond each end of the load bearing metal member 16 as more clearly illustrated in FIGS. 2 and 3 of the invention to provide arcuate segments 25 and 26 projecting beyond the ends of the load bearing member 16.

This provides an arrangement so that suitable means such as the straps 27 and 28 may be engaged with the arcuate surfaces 25a and 26a of the arcuate segments to enable the load bearing metal members 16 and the foamed polyurethane bonded therewith to be positioned adjacent the tubular member P as illustrated in FIG. 2 of the drawings. The strap means 27 and 28 may be of a conventional form with suitable buckle means 30 for engaging and locking the ends of the straps 27 and 28.

It will be noted that the form of support 21 illustrated in the drawings is an I beam having the web 21a joined with the legs 21b and 21c. The flat bottom 17 of the load bearing member 16 engages the leg 21b throughout the width of the upper surface thereof, thus distributing the load of the tubular member more uniformly throughout the foamed plastic material. This enables polyurethane having a density in the range of 7 to 10 pounds per cubic foot to be employed, and as a practical matter, it has been found that polyurethane in the range of 7½ pounds per cubic foot performs quite adequately. Under some circumstances, polyurethane of greater density than the above range may be desirable.

Suitable means such as short sections of angle iron as shown at 35 and 36 may be welded, bolted, or otherwise secured to the I beam 21 for engaging the sides 18 and 19 of member 16 to inhibit lateral movement of the supported tubular member. Such arrangement accommodates any longitudinal movement of the pipe P and the invention 15. Also, it is to be noted that even though some longitudinal movement of the pipe P may occur, the arrangement of 16 is such that flat bottom surface 17 is always in contact with leg 21b throughout its width.

In FIG. 4, an alternate form of employing the invention is shown. A pair of devices 15 of the form and construction is deployed on the tubular member P in diametrically opposed relationship as shown at 41 and 42. The device 15 rests on I beam 21, and the I beam support 21 includes the vertically extending members 43 and 44 secured to 21 by any suitable means. A horizontal member 45 is connected between the upper ends of members 43 and 44. The member 45 engages the base 17 of the device 15 positioned at 42 on tubular member P, and the beam 21 engages the base 17 of the device 15 positioned at 41.

The member 45 and beam 21 each include means to inhibit lateral shifting of the tubular member P, which are shown as angle iron portions 50, 51, 52, and 53 bolted, welded, or otherwise secured to 45 and 21, respectively. Insulation 10 as previously discussed covers tubular member P between the devices 15 and strap means 30 also engage and retain the devices 15 in position.

The support and insulation arrangement shown in FIG. 4 prevents lateral and up and down movement of tubular member P.

The foregoing disclosure and description of the invention are illustrative and explanatory thereof, and various changes in the size, shape, and materials as well as in the details of the illustrated construction may be made without departing from the spirit of the invention.

What is claimed is:

1. A rigid insulation support for engaging and positioning an insulated tubular member on the upper surface of a support member including:
   a. a load bearing metal member;
   b. said load bearing metal member having a substantially flat bottom for engaging the upper surface of the support member throughout the width thereof;
   c. said load bearing metal member having sides extending substantially the length thereof and substantially perpendicular to said bottom;
   d. a foamed, rigid plastic load bearing member bonded to said sides and said bottom of said load bearing metal member;
   e. said foamed, rigid plastic load bearing member having an integral arcuate segment extending above said sides of said load bearing metal member and said arcuate segment having extensions extending beyond said flat bottom of said load bearing metal member at each end thereof;
   f. said integral arcuate segment having an upper arcuate surface for engaging the tubular member;
   g. said arcuate segment extensions beyond the ends of said flat bottom forming arcuate surfaces for securing said foamed, rigid plastic load bearing member to the insulated tubular member; and
   h. means secured to the support member and abutting said sides of said load bearing metal member to inhibit lateral movement of the insulated tubular member while accommodating longitudinal movement of the insulated tubular member and rigid insulation support.

* * * * *